Figure 1:
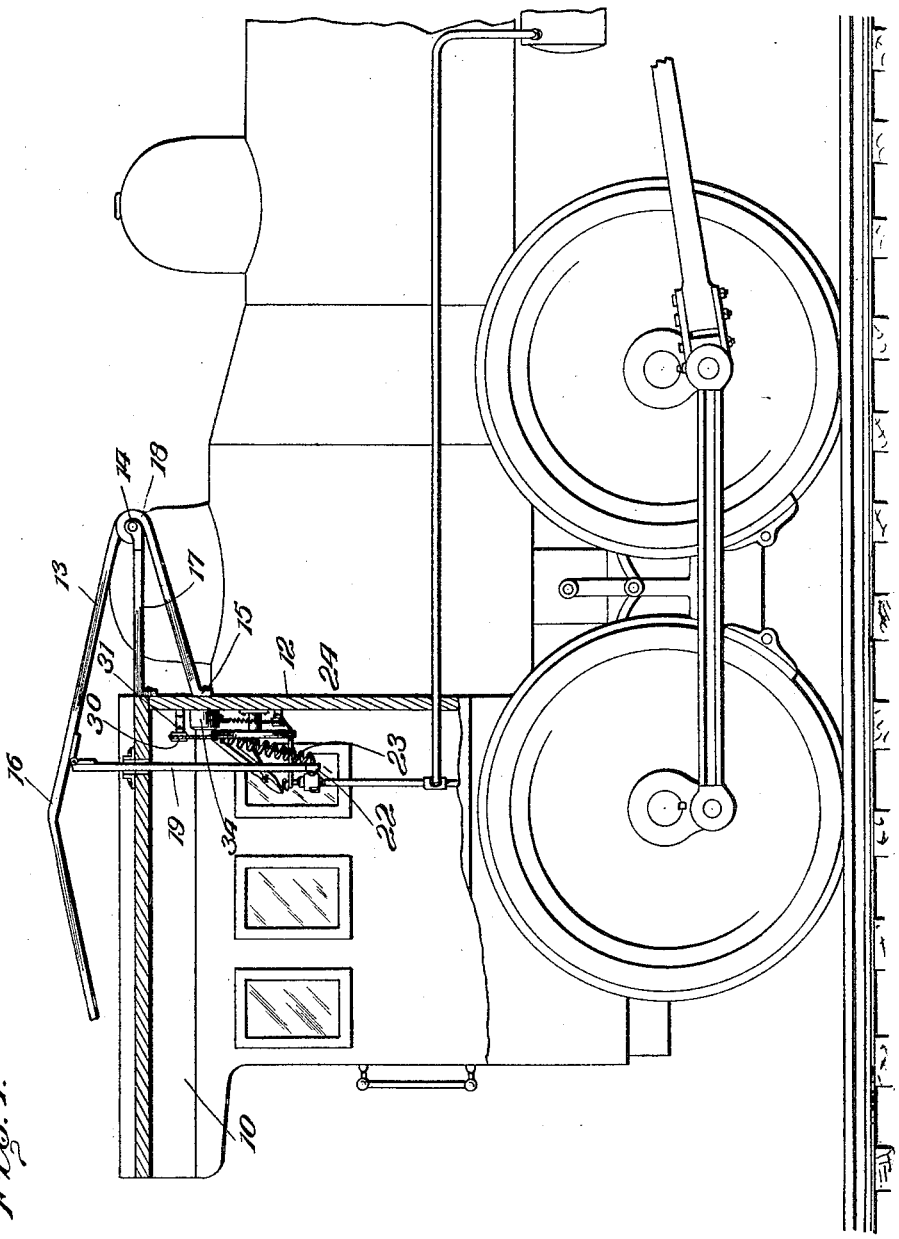

N. A. OLIVER.
BRAKE APPLYING MECHANISM FOR TRAINS.
APPLICATION FILED FEB. 25, 1913.

1,133,497.

Patented Mar. 30, 1915.
2 SHEETS—SHEET 1.

Inventor
N. A. Oliver.

Witnesses

By

Attorneys

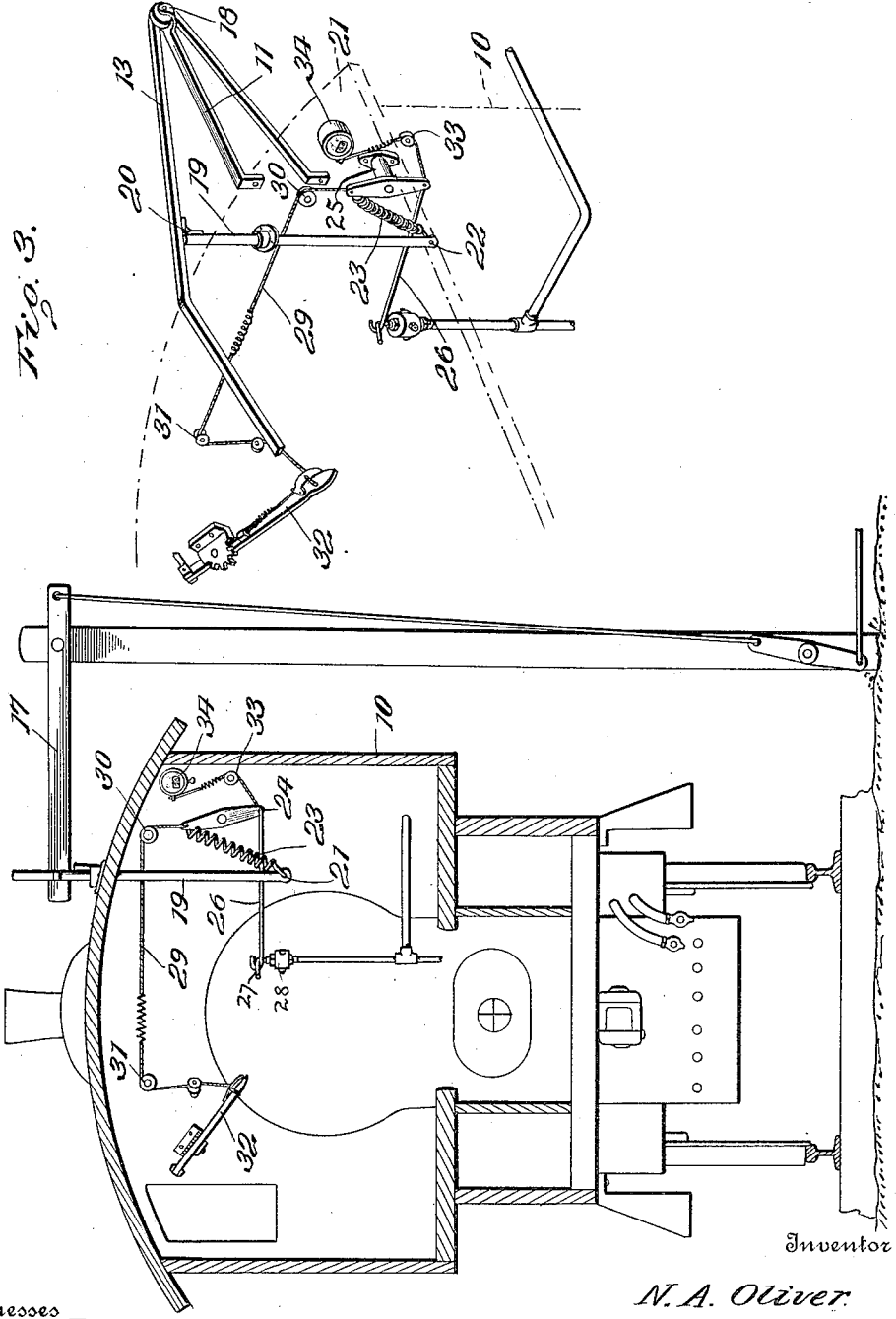

UNITED STATES PATENT OFFICE.

NATHAN A. OLIVER, OF MATTAPOISETT, MASSACHUSETTS.

BRAKE-APPLYING MECHANISM FOR TRAINS.

1,133,497.     Specification of Letters Patent.     Patented Mar. 30, 1915.

Application filed February 25, 1913. Serial No. 750,671.

*To all whom it may concern:*

Be it known that I, NATHAN A. OLIVER, citizen of the United States, residing at Mattapoisett, in the county of Plymouth and State of Massachusetts, have invented certain new and useful Improvements in Brake-Applying Mechanisms for Trains, of which the following is a specification.

This invention relates to an improvement in brake applying mechanisms for trains.

The primary object of the invention is to provide a mechanism for applying the air brakes of a train should the same enter a block in which the signals are set for danger.

A further object of the invention is to provide a construction which will operate mechanically, regardless of weather conditions, and whose operation will not depend upon electrical power.

A still further object of the invention is to provide a construction which will reset itself after having been operated, and which will be constantly set without interfering with the normal operation of the air brakes.

A further object of the invention is to provide a mechanism which may be installed upon locomotives now in use without altering their construction and at small cost.

Another object of the invention is to provide a construction which will operate to apply the brakes as soon as a train enters a block in which the signals are set at danger, and which, while at all times under the control of the engineer, cannot be set other than at a position to be operated by the danger signal.

For a full understanding of the invention, reference is to be had to the following description and accompanying drawings, in which:—

Figure 1 is a side elevation of a portion of a locomotive equipped with the apparatus, the cab being shown in section to more clearly illustrate the arrangement of the valve operating structure; Fig. 2 is a transverse section through the cab; Fig. 3 is a diagrammatic view of the entire apparatus.

Corresponding and like parts are referred to in the following description and indicated in all the views of the drawing by the same reference characters.

The invention broadly contemplates the provision of a mechanism carried by the locomotive and having an operative connection with the emergency valve which will be acted upon by a signal set at the side of the brake to open said valve and to apply the brakes. While the mechanism is illustrated as supported by the cab and connected directly with the emergency valve, it will be noted that it may be supported at any suitable point and connected to a brake operating mechanism in any practical manner.

In the drawings, 10 designates the cab of a locomotive. A bracket 11 is supported on the front wall 12 of the cab, said bracket supporting a beam 13 of resilient material. Said beam is coiled about the transverse portion 14 of the bracket and its terminal 15 is secured to the cab. The beam is bent at 16 and extends back over the roof of the cab. The beam is resilient and is disposed in the path of a trip arm which is either a part of a semaphore signal or a specially constructed arm set at the time a train enters a block.

When the locomotive enters the block in which the signals are set at danger, the engineer having ignored said danger signals, the arm 17 contacts with the resilient beam 13 and depresses its free terminal, that is, the beam bends with its coiled portion 18 as a hinge. The brake operating mechanism is controlled by this depression of the beam. This mechanism consists of a rod 19 which is hingedly connected at 20 to the beam 13 and extends through the roof 21 of the cab. The lower terminal 22 of this rod is connected to a coiled spring 23, which is formed of relatively heavy wire, and has its terminal remote from the rod 19 connected to a lever 24. This lever 24 is pivoted centrally on the shaft 25 which is supported by a bracket secured to the inner front wall 12 of the cab. It will we noted that as the beam 13 is depressed, the rod 19 will rotate the lever 24. The terminal of this lever remote from its connection with the spring 23 is connected to the rod 26 which is connected to the lever 27 of the emergency valve 28. Thus, when the beam 13 is depressed and the lever 24 rotated, the rod 26 will operate the emergency valve and apply the brakes.

When the lever 24 is rotated slightly by the movement of the rod 19, the spring 23 will overcome the tendency of the spring beam 13 to reset the lever 24 and the valve will remain open, thus assuring the application of the brakes. It will be noted that the beam 13 is constantly set to be actuated, except when the brakes are being applied. A cable 29 is secured to the same terminal of the lever 24 as the spring 23, and this cable passes over sheaves 30 and 31 to the throttle operating lever 32 provided with a segment engaging member. This lever is actuated by rotation of the lever 24 to close the throttle valve. A link 33 is connected to the same terminal of the lever 24 as the rod 26, said link being connected to a recorder 34. It will be noted that upon each application of the brakes the recorder will be actuated and a record thus maintained of the number of times the brakes are applied by the mechanism. Thus, each time the train enters a block in which the danger signals are set, a record will be made.

The many advantages of a construction of this character will be clearly apparent, as it will be noted that it provides an effectual mechanical means for applying the air brakes of a train which will operate under all weather conditions and which is of such construction that it will not readily get out of order. It will also be seen that it may be easily and economically manufactured and that the various parts may be readily assembled.

Having thus described my invention, what I claim as new and desire to secure by Letters Patent is:

1. A brake applying mechanism for trains comprising a resilient beam, one terminal of which is secured to the cab of an engine, a bracket supporting said beam intermediate its ends, a rod connected to said beam and disposed to extend within the cab, a brake applying mechanism, and a connection between said rod and brake applying mechanism, whereby depression of the beam will apply the brakes.

2. A brake applying mechanism for trains comprising a resilient beam, one terminal of which is secured to the cab of an engine, a bracket supported on the cab, and connected to said beam intermediate its ends, a rod hingedly connected to said beam and extending within the cab, a stub-shaft supported within the cab, a lever arranged on said stub-shaft, a coiled spring, one of the terminal convolutions of said spring being connected to said lever, its other terminal convolution being connected to said rod, a valve controlled brake applying mechanism, the valve of said mechanism including a handle portion, and a rod secured to said lever, said rod at its terminal remote from the lever being bent to embrace the valve handle, whereby the actuation of the lever through the medium of the first-mentioned rod will operate the valve to apply the brakes.

3. A brake applying mechanism for trains including a resilient beam, one terminal of which is secured to the cab of an engine, a bracket supporting said beam intermediate its ends, the free end portion of the beam being substantially arcuate in shape, a rod connected to the intermediate part of the free end portion of the beam, a brake applying mechanism, and operative connection between such mechanism and the rod.

4. A brake applying mechanism for trains including a bracket attached to the cab of a locomotive, a resilient beam attached at one end to the cab of a locomotive and bent intermediate its length to provide an eye for engagement by the bracket, a brake applying mechanism, and operative connection between the brake applying mechanism and the free end portion of the beam.

5. A brake applying mechanism for trains including a resilient beam, one terminal of which is secured to an engine, a bracket supporting the intermediate portion of the beam, an operating member hinged to the free portion of the beam, a lever, a resilient connection between the operating member and lever, a brake controlling valve, and an operative connection between the lever and such valve.

6. A brake applying mechanism for trains including a resilient beam, one terminal of which is secured to an engine, a bracket supporting the intermediate portion of the beam, an operating member hinged to the free portion of the beam, a lever, a resilient connection between the operating member and lever, and means for operatively connecting such lever to the throttle lever of the engine.

In testimony whereof I affix my signature in presence of two witnesses.

NATHAN A. OLIVER. [L. S.]

Witnesses:
 JENNIE D. W. ATSATT,
 JOHN T. ATSATT.

Copies of this patent may be obtained for five cents each, by addressing the "Commissioner of Patents, Washington, D. C."